(12) United States Patent
Guo et al.

(10) Patent No.: US 10,731,266 B2
(45) Date of Patent: Aug. 4, 2020

(54) COMPOSITE ANODE UNIT, ANODE PLATE AND METHODS FOR PREPARING THE SAME

(71) Applicants: KUNMING HENDERA SCIENCE AND TECHNOLOGY CO., LTD., Kunming (CN); KUNMING UNIVERSITY OF SCIENCE AND TECHNOLOGY, Kunming (CN); JINNING HENDERA SCIENCE AND TECHNOLOGY CO., LTD., Kunming (CN)

(72) Inventors: Zhongcheng Guo, Kunming (CN); Hui Huang, Kunming (CN); Buming Chen, Kunming (CN); Xuelong Li, Kunming (CN); Panlong Zhu, Kunming (CN); Jin Dong, Kunming (CN); Mingxi Pan, Kunming (CN); Feng Huang, Kunming (CN); Taixiang Huang, Kunming (CN); Ning Tan, Kunming (CN); Chutao Huang, Kunming (CN)

(73) Assignees: KUNMING HENDERA SCIENCE AND TECHNOLOGY CO., LTD., Kunming (CN); KUNMING UNIVERSITY OF SCIENCE AND TECHNOLOGY, Kunming (CN); JINNING HENDERA SCIENCE AND TECHNOLOGY CO., LTD., Kunming (CN)

( * ) Notice: Subject to any disclaimer, the term of this patent is extended or adjusted under 35 U.S.C. 154(b) by 406 days.

(21) Appl. No.: 15/845,490

(22) Filed: Dec. 18, 2017

(65) Prior Publication Data
US 2019/0078224 A1   Mar. 14, 2019

(30) Foreign Application Priority Data
Sep. 11, 2017 (CN) .......................... 2017 1 0812458

(51) Int. Cl.
*C25C 7/02* (2006.01)
*B21C 23/22* (2006.01)
*C25D 9/06* (2006.01)

(52) U.S. Cl.
CPC ................ *C25C 7/02* (2013.01); *B21C 23/22* (2013.01); *C25D 9/06* (2013.01)

(58) Field of Classification Search
CPC .... C25C 7/02; C25C 7/025; C25C 1/06–1/18; C25B 11/0405; C25B 11/0442; C25B 11/0478–11/0494
See application file for complete search history.

(56) References Cited

U.S. PATENT DOCUMENTS

| 4,459,189 A | 7/1984 | Vance et al. |
| 4,581,117 A * | 4/1986 | Asano ....................... C25C 7/02 204/290.09 |
| 2008/0237036 A1 | 10/2008 | Barker et al. |

FOREIGN PATENT DOCUMENTS

| CN | 206319070 U | 7/2017 |
| EP | 0376447 A1 | 7/1990 |
| WO | 2014165912 A1 | 10/2014 |

OTHER PUBLICATIONS

Casellato et al.: "Anodic Synthesis of Oxide-Matrix Composites. Composition, Morphology, and Structure of PbO2-Matrix Composites;" Chemistry of Materials, vol. 9, No. 4; American Chemical Society, Jan. 1997; pp. 960-966.
(Continued)

*Primary Examiner* — Alexander W Keeling
(74) *Attorney, Agent, or Firm* — Maschoff Brennan (57) ABSTRACT

The present disclosure provides a composite anode unit, comprising: a metal core rod; a metal layer coated on the metal core, wherein the metal layer is lead or lead alloy; a conductive ceramic layer coated on the metal layer, wherein the conductive ceramic layer comprises $\beta$-$PbO_2$—$Al_2O_3$
(Continued)

composite oxide; an active ceramic layer is coated on the conductive ceramic layer, wherein the active ceramic layer comprises γ-$MnO_2$—$Ti_4O_7$ composite oxide. Methods for preparing the composite anode unit and an anode plate made from the composite anode unit are also provided.

17 Claims, 6 Drawing Sheets

(56) References Cited

OTHER PUBLICATIONS

Zhang et al.: "Electrochemical Properties and Microstructure of Al/Pb—Ag and Al/Pb—Ag—Co Anodes for Zinc Electrowinning;" Acta Metallurgica Sinica (Engl. Lett.), vol. 27, No. 2; 2014; pp. 331-337.

* cited by examiner

COMPOSITE ANODE UNIT, ANODE PLATE AND METHODS FOR PREPARING THE SAME

CROSS REFERENCE TO RELATED APPLICATIONS

This application claims the priority of Chinese Patent Application No. 201710812458.0, filed on Sep. 11, 2017 and titled with "COMPOSITE ANODE UNIT, ANODE PLATE AND METHODS FOR PREPARING THE SAME", and the disclosures of which are hereby incorporated by reference.

FIELD

The present invention relates to the field of electrochemical technology and hydrometallurgy, specifically to a composite anode unit, an anode plate and methods for preparing the same.

BACKGROUND

At present, lead and lead alloy are used as anode during the process of extracting metals such as zinc, copper, nickel, manganese and chromium by hydrometallurgy. Anodes of this type have limited applications because of the various disadvantages such as: high cell voltage (3.4V to 3.8V); low current efficiency (75% to 88%); high energy consumption in electrowinning process (3400 kWh to 4200 kWh for one ton of Zn); short service life of the anode (half year to one year); the lead dissolves in the electrolyte and the resulting lead is deposited on the cathode subsequently resulting in a decrease in the purity of the deposit obtained. In order to reduce the energy consumption from the electrowinning of zinc, copper, nickel, cobalt, manganese and chromium and prevent the contamination of a cathode deposit, research and development of insoluble anode used in electrowinning process are carried out all over the world. Taking into account the current research and usage at home and abroad, there are mainly six types as follows:

(1) Lead-silver alloy (0.5 wt % to 1.0 wt % of silver) anode: although the manufacturing technique is simple, it is expensive due to the high content of silver. Therein, Pb—Ag—Ca ternary alloy anode and Pb—Ag—Ca—Sr quaternary alloy anode have advantages such as high strength, high corrosion resistance, long service life and low cost. However, when it is used, it causes local area corrosion and hard crusts on the surface of anode slime, which is hard to be removed, resulting in the increase of cell voltage, as well as great loss of silver and calcium when the anode is recycled.

(2) Titanium-based dimensionally stable anode with plating surface (coated with precious metal or oxide thereof), which has advantages of: overall dimensions stable, no short circuit problem caused by deformation and bending, high quality cathode products, light weight of the plate which is convenient for transportation and replacement. One of the preferred anodes of the group for electrowinning has been found to be Ti/IrO$_2$(70%)-Ta$_2$O$_5$(30%) anode since the anode is more stable to the oxygen evolved during electrowinning. However, this anode is rather expensive due to the high cost of iridium and experience with the anode has shown that the presence of manganese ions in the electrolyte adversely affects the coating by precipitation of manganese oxides on the anode. Such manganese oxides do not show any electrocatalytic properties and is electrically insulating and therefore the anode becomes progressively disactivated, easily causing the peeling off of plating layer and short service life. In addition, titanium-based coating layer anode cannot be used in electrolyte that contains P ion; sometimes, metals in coating layer dissolves and causes the damage of the plate.

(3) New type inert lead dioxide anode: titanium, graphite, plastic and ceramic are usually chosen as the substrate material for this type of electrode. The anode was produced by applying to a titanium substrate after surface roughening treatment an electro-conductive under coating consisting mainly of metal oxides, then covering the undercoating with an intermediate coating consisting of a stress-free α-PbO$_2$ deposit, and finally covering the intermediate coating with a top coating consisting of β-PbO$_2$. However, the PbO$_2$ anode prepared by electroplating as an insoluble anode has the following problems during use: a. PbO$_2$ deposition layer cannot combine tightly with the surface of the electrode or the deposition layer is non-uniform; b. the PbO$_2$ deposition layer is polyporous, rough and with a strong internal stress; c. PbO$_2$ deposition layer is easily peeled off or eroded, resulting in a short service life; the PbO$_2$ anode with fluorine-containing resin and/or inactive particles has a high cell voltage when it is used in hydrometallurgy.

(4) The anode obtained through inter-fusion process of molten salt electroless plating transitional layer, or electroplating methods, using light-weight metal aluminum as a core and lead alloy as an outer layer, which also has problems difficult to solve: the fluidity of the lead alloy and holes that may exist at some parts of the large size anode plate; grain boundary cracks on the plating layer, which allows oxygen generated during electrolysis process to pass the cracks and oxidize the aluminum matrix, forming alumina film with poor conductivity and causing the deterioration of the anode properties.

(5) Lead anode after surface pre-treatment. Lead-based alloy itself is unstable in sulfuric acid. When the lead-based alloy anode is put into the sulfuric acid solution, reaction occurs on the surface of the new anode rapidly, and the surface of anode is gradually covered by a nonconductive PbSO$_4$ layer. The nonconductive PbSO$_4$ layer blocks further erosion of the inner lead alloy while leads to the increase of the cell voltage of the anode. The high oxygen evolution potential on the lead surface leads to the generation of PbO$_2$. Although α-PbO$_2$ or β-PbO$_2$ can be obtained by conditioning the lead anode surface through conventional methods, the α-PbO$_2$ has an orthorhombic structure with poor conductivity and low hardness; the β-PbO$_2$ has high oxygen evolution overpotential, leading to a high cell voltage. In addition, it cannot solve the lead into the cathode product, reduce the cathode product quality. In order to overcome the above problems, lead dioxide is replaced by manganese dioxide as the last outer layer. As an insoluble anode, manganese dioxide has a low oxygen evolution overpotential and save energy. However, most of the electrolytic manganese dioxide is obtained in sulfuric acid system, and the thickness needs to between 10 μm and 100 μm; the manganese dioxide plating layer is prone to fall off when the thickness is over 100 μm. In addition, when it is used in electrolyte containing chloride ion, the generation of Cl$_2$ cannot be inhibited efficiently.

(6) Fence-like anode plate for metal extraction by hydrometallurgy, which has advantages of: improving the fluidity of the electrolyte, enhancing the efficiency and the quality of electrolysis metal collection, avoiding the disadvantage of touching the anode plate when the cathode plate is lifted, decreasing the material cost by using cheap aluminum matrix as the substrate. However, it still has disadvantages of: high cell voltage, short circuit due to the crystallization on the surface of conductive beam, the distribution of power lines affected by the insulating sheath, low yield of cathode product and short service life.

With the continuous exploitation of zinc resources, high-quality zinc concentrate is decreasing while impurity enriched zinc concentrate which is hard to smelt is increasing gradually, causing the entry of various zinc-containing materials that are not assured in the past into the recycling process. The purchase and utilization of high-chloride zinc concentrate and zinc-oxide powder at home and aboard is also one of the main reasons that leads to the seriously slump of technical indicators in production. Experiments show that when the content of chlorine in electrolyte is over 1000 mg/L, anode is eroded by chloride ion, which is oxidized to chlorate, the plate becomes thin and perforated, and the service life is shortened. Therefore, it has an important practical value to find a new type of energy-efficient inert anode with low cost, corrosion resistance, high conductivity, deformation resistance and long service life for the industrial production of hydrometallurgy.

SUMMARY

In view of above, the present disclosure provides a composite anode unit and preparation method thereof, and an anode plate and preparation method thereof. The composite anode unit has high electro-catalytic activity and long service life.

The present disclosure provides a composite anode unit, comprising:

a metal core rod;

a metal layer coated on the metal core rod, wherein the metal layer is lead or lead alloy;

a conductive ceramic layer coated on the metal layer, wherein the conductive ceramic layer comprises $\beta$-$PbO_2$—$Al_2O_3$ composite oxide;

an active ceramic layer coated on the conductive ceramic layer, wherein the active ceramic layer comprises $\gamma$-$MnO_2$—$Ti_4O_7$ composite oxide.

Preferably, a first metal layer is provided between the metal core rod and the metal layer; the first metal layer is formed from nano-silver; an oxide layer is provided between the metal core and the first metal layer.

Preferably, the cross section of the metal core rod is rectangle, oval or circle; the major axis of the cross section of rectangle and oval is independently from 6 mm to 150 mm; the minor axis is independently from 2 mm to 20 mm; the diameter of the circle cross section is from 3 mm to 100 mm; the thickness of the metal layer is from 1 mm to 30 mm; the thickness of the conductive ceramic layer and the active ceramic layer are independently from 10 μm to 200 μm.

Preferably, $Al_2O_3$ content in the $\beta$-$PbO_2$—$Al_2O_3$ composite oxide is from 1 wt % to 8 wt %; $Ti_4O_7$ content in the $\gamma$-$MnO_2$—$Ti_4O_7$ composite oxide is from 1 wt % to 8 wt %.

The present disclosure also provides a preparation method for the composite anode unit, comprising:

S1) forming the metal layer on the metal core rod by extrusion coating process, wherein the metal layer is lead or lead alloy;

S2) forming the conductive ceramic layer on the metal layer by composite anodic electrodeposition, wherein the conductive ceramic layer comprises $\beta$-$PbO_2$—$Al_2O_3$ composite oxide;

S3) forming the active ceramic layer on the conductive ceramic layer by composite anodic electrodeposition, wherein the active ceramic layer comprises $\gamma$-$MnO_2$—$Ti_4O_7$ composite oxide.

Preferably, the bath temperature for composite anodic electrodeposition in step S2) is from 20° C. to 80° C.; the anodic current density is from 0.1 A/dm² to 10 A/dm²; the electroplating bath composition of composite anodic electrodeposition comprises: 10 g/L to 150 g/L of sulfuric acid, 5 g/L to 20 g/L of alumina particles, 1 g/L to 5 g/L of cobalt sulfate, 1 g/L to 8 g/L of magnesium sulfate, 1 g/L to 40 g/L of fluoride ion and 2 g/L to 6 g/L of bismuth ion;

the bath temperature for composite anodic electrodeposition in the step S3) is from 40° C. to 90° C.; the anodic current density is from 0.01 A/dm² to 1 A/dm²; the electroplating bath composition of the composite anodic electrodeposition comprises: 30 g/L to 250 g/L of manganese sulfate, 30 g/L to 100 g/L of sulfuric acid, 5 g/L to 20 g/L of Titanium sub-oxide nano-particles, 1 g/L to 10 g/L of cerium ion, 10 g/L to 100 g/L of potassium sodium tartrate.

Preferably, the step S1) comprises:

casting melting lead or lead alloy to obtain a lead ingot; subjecting the lead ingot to hot-extrusion process to obtain a lead rod; subjecting the lead rod and the metal core rod to extrusion coating process to form the metal layer on the metal core rod.

Preferably, the step S1) further comprises:

subjecting the metal core rod to anodic oxidation treatment to form an oxide layer;

forming a nano-silver layer on the oxide layer by electrochemical process; forming the metal layer on the nano-silver layer by extrusion coating process.

The present disclosure also provides an anode plate, comprising:

an anode substrate, which is composed of the composite anode unit;

a conductive beam, which is provided on one side of the anode substrate and connected to the anode substrate.

Preferably, the anode substrate has a fence-like structure; the length of the anode substrate is from 300 mm to 3000 mm; the width of the anode substrate is from 200 mm to 1500 mm; the gap between the composite anode units is from 3 mm to 40 mm; the number of the composite anode unit in the anode substrate is from 10 to 80 per piece; the surface area of the anode substrate is from 0.5 m² to 3.6 m².

The present disclosure provides a composite anode unit, comprising: a metal core rod; a metal layer coated on the metal core rod, wherein the metal layer is lead or lead alloy; a conductive ceramic layer coated on the metal layer, wherein the conductive ceramic layer comprises $\beta$-$PbO_2$—$Al_2O_3$ composite oxide; an active ceramic layer is coated on the conductive ceramic layer, wherein the active ceramic layer comprises $\gamma$-$MnO_2$—$Ti_4O_7$ composite oxide. Comparing with the conventional technology, the outer layer of the composite anode unit provided by the present disclosure comprises $\gamma$-$MnO_2$—$Ti_4O_7$ composite oxide, in which the $\gamma$-$MnO_2$ has a low oxygen evolution potential, and the adding of titanium sub-oxide can further improves its electro-catalytic activity and corrosion resistance. In addition, the $\beta$-$PbO_2$—$Al_2O_3$ composite oxide in the intermediate conductive ceramic layer has a good corrosion resistance and conductivity, so that the composite anode unit has a long service life as well as low cell voltage. Furthermore, $\gamma$-$MnO_2$ has low oxygen evolution overpotential and high chloride evolution overpotential during electrolysis, therefore the evolution of chlorine is inhibited.

DETAILED DESCRIPTION

The technical solutions in the embodiments of the present disclosure will be described clearly and completely herein after in conjunction with the examples of the present disclosure. Apparently, the described examples are only a part of the examples of the present disclosure, rather than all examples. Based on the examples in the present disclosure, all of other examples made by one of ordinary skill in the art without any creative efforts, fall into the protection scope of the present disclosure.

In the description of the present disclosure, the orientations or positional relations indicated by terms such as "longitudinal", "lateral", "up", "down", "front", "back", "left", "right", "vertical", "horizontal", "top", "bottom" and the like are based on the orientations or positional relations shown in the figures, which is merely for the convenience of describing the present disclosure rather than requiring that the present disclosure must be constructed and operated in a particular orientation. Thus, it should not be understood as a restriction for the present disclosure.

It should be noted that terms "first" and "second" are merely used for the purpose of description, which cannot be interpreted as indicating or implying relative importance or implicitly indicating the number of technical features indicated. Thus, features which are defined as "first" and "second" explicitly or implicitly comprise one or more than one of the feature. Further, unless stated otherwise, "multiple" means two or more than two in the descriptions of the present disclosure.

The present disclosure provides a composite anode unit, comprising:

a metal core rod;

a metal layer coated on the metal core rod, wherein the metal layer is lead or lead alloy;

a conductive ceramic layer coated on the metal layer, wherein the conductive ceramic layer comprises $\beta$-$PbO_2$—$Al_2O_3$ composite oxide;

an active ceramic layer coated on the conductive ceramic layer, wherein the active ceramic layer comprises $\gamma$-$MnO_2$—$Ti_4O_7$ composite oxide.

Figure 1:
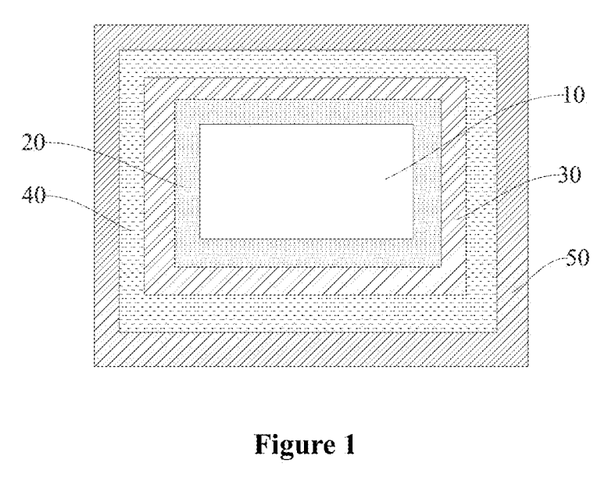
FIG. 1 is a cross section showing the structure of the composite anode unit.

As shown in FIG. 1, which is the structure of the composite anode unit provided by the present disclosure, wherein 10 indicates the metal core rod, 20 indicates the first metal layer, 30 indicates the metal layer, 40 indicates the conductive ceramic layer and 50 indicates the active ceramic layer.

Herein, the metal core rod can be any of the well-known metal core rods to those of ordinary skill in the art without special restriction; aluminum and aluminum alloy is preferred in the present disclosure. The matrix made from aluminum or aluminum alloy has a light weight and low production costs. In some examples provided by the present disclosure, the metal core rod is preferably aluminum rod. The density of aluminum is more than four times lower than that of lead alloy, which leads to the decrease of the material cost under the same material size. The conductivity of aluminum is seven times as much as lead, ranking only behind silver and copper. In addition, aluminum has a light weight and a strength higher than lead. The cross section of the metal core rod is preferably rectangle, oval or circle. When the cross section of the metal core rod is rectangle or oval, the major axis of the cross section of rectangle or oval is preferably from 6 mm to 150 mm, more preferably from 10 mm to 100 mm. The minor axis is preferably from 2 mm to 20 mm, more preferably from 3 mm to 15 mm. When the cross section of the metal core is circle, the diameter is preferably from 3 mm to 100 mm, more preferably from 6 mm to 50 mm. The wider the cross section of the metal core rod is, the easier it is to clean the manganese dioxide on the anode slime, and lighter the weight of the anode plate made from the composite anode unit. The cylinder of the metal core rod is preferably selected from the group comprising of corrugation, heterogeneous serration and serration, or a mixture thereof. These structures can enhance the binding force between the metal core rod and the metal layer, avoiding short circuit caused by the peeling off of the oxides during electrolytic process.

According to the present disclosure, a first metal layer is preferably coated on the metal core rod, which avoids the generation of poor conductive oxides during the preparation process and benefits the miscibility of the metal core rod with other metals, resulting in the decrease of the interface resistance and reduction of the cell voltage. In the present disclosure, it is more preferred to coat an oxide layer on the metal core rod first, and then the first metal layer. The thickness of the oxide layer is preferably from 0.1 µm to 4 µm; the first metal layer is preferably nano-silver; the thickness of the first metal layer is preferably from 0.02 µm to 2 µm, more preferably from 0.5 µm to 2 µm.

There is a metal layer coated on the first metal layer which can increase the corrosion resistance of the composite anode unit in sulfuric acid system and favor the follow-up formation of conductive film. The metal layer can be any of the well-known metal layers to one of ordinary skill in the art without any special restriction. Lead or lead alloy is preferred in the present disclosure, giving the metal layer a higher corrosion resistance and conductivity. The thickness of the metal layer is preferably from 1 mm to 30 mm, more preferably from 3 mm to 25 mm, more preferably from 3 mm to 20 mm, more preferably from 3 mm to 15 mm, more preferably from 3 mm to 10 mm, even more preferably from 3 mm to 6 mm, and most preferably from 3 mm to 4 mm. Generally, the thicker the metal layer is, the longer the service life of the anode. But an unduly thick metal layer may build up a connection between cathode and anode, thereby causing short circuit between the cathode and anode plate. The anode has a long service life and good conductivity when the thickness of the metal layer is from 1 mm to 30 mm.

The metal layer is coated by a conductive ceramic layer which comprises $\beta$-$PbO_2$—$Al_2O_3$ composite oxide. The amphoteric $Al_2O_3$ is introduced into $\beta$-$PbO_2$ plating layer, which has the following effects: 1) decreasing the porosity in the plating layer and preventing the erosion of the electrode material by the electrolyte; 2) the particles embedded in the plating layer can react with hydrochloric acid and dissolve, forming homogenous etch pits on the surface; the follow-up composite electrodeposition reduces cracks on the $\gamma$-$MnO_2$ coating layer, making the binding between $\beta$-$PbO_2$ and $MnO_2$ tight, improving the activity of electrode and extending the service life of the electrode; 3) the active ceramic layer comprises manganese dioxide which will peel off due to internal stress when the manganese dioxide plating layer is thicker than 100 μm, and $\beta$-$PbO_2$—$Al_2O_3$ composite oxide can decrease the internal stress of the manganese dioxide plating layer. The manganese dioxide is easy to peel off with the increasing thickness of the active ceramic layer. Thus, on the one hand, $\beta$-$PbO_2$ and $Mn^{2+}$ react in the electroplating solution comprises $\beta$-$PbO_2$ and $Mn^{2+}$ and easily form Pb—$MnO_x$ admixture of crystal and amorphous structure on the surface, making the binding of $MnO_2$ to the conductive ceramic easy and not easy to peel off. On the other hand, the introduction of $Al_2O_3$ particle after immersing in hydrochloric acid solution with the conductive ceramic layer causes the formation of homogenous etch pits on the surface of the conductive ceramic layer, reducing the cracks on the $\gamma$-$MnO_2$ coating layer after the follow-up composite electrodeposition.

According to the present disclosure, the thickness of the conductive ceramic layer is preferably from 10 μm to 200 μm, more preferably from 30 μm to 150 μm, most preferably from 30 μm to 100 μm. If the conductive ceramic layer is too thick, it is prone to form cracks and the production cost is high, while if it is unduly thin, it has a poor conductivity and corrosion resistance. When the conductive ceramic layer has a thickness of 10 μm to 200 μm, the conductive ceramic layer has a good conductivity, good corrosion resistance, low production cost and free of crack. The content of $Al_2O_3$ in $\beta$-$PbO_2$—$Al_2O_3$ composite oxide of the conductive ceramic layer is preferably from 1 wt % to 8 wt %. Low content of $Al_2O_3$ has little effect while high content of $Al_2O_3$ will cause cracks on the plating layer or a coarse plating layer.

An active ceramic layer is coated on the conductive ceramic layer, which comprises $\gamma$-$MnO_2$—$Ti_4O_7$ composite oxide. When the $\gamma$-$MnO_2$ in the $\gamma$-$MnO_2$—$Ti_4O_7$ composite oxide is used in electrolyte containing chloride ion, oxygen escapes more easily and the generation of chlorine is inhibited. It not only reduces the corrosion rate of the anode, but also improves the working condition for the workers and enhances the production efficiency greatly. Meanwhile, the introduction of the Titanium sub-oxide nano-particles into the $\gamma$-$MnO_2$ coating layer works synergistically, further improving the corrosion resistance and catalytic activity greatly.

According to the present disclosure, the thickness of the active ceramic layer is preferably from 10 μm to 200 μm, more preferably from 20 μm to 150 μm, even more preferably from 20 μm to 100 μm, and most preferably from 20 μm to 80 μm. If the active ceramic layer is too thick, it is prone to form cracks and the production cost is high, while if it is unduly thin, it has a poor conductivity and corrosion resistance. When the active ceramic layer has a thickness of 10 μm to 200 μm, the conductive ceramic layer has a good conductivity, good corrosion resistance, low production cost and free of crack. The content of $Ti_4O_7$ in $\gamma$-$MnO_2$—$Ti_4O_7$ composite oxide of active ceramic layer is preferably from 1 wt % to 8 wt %. Too low content of $Ti_4O_7$ has little effect and poor catalytic activity and the corrosion resistance while too high content of $Ti_4O_7$ will cause cracks on the coating layer or a coarse coating layer. When the percentage of $Ti_4O_7$ is from 1 w % to 8 w %, the active ceramic layer has a good catalytic activity and corrosion resistance, and the plating layer is smooth and not easy to crack.

The outer layer of the composite anode unit provided by the present disclosure comprises $\gamma$-$MnO_2$—$Ti_4O_7$ composite oxide, in which the $\gamma$-$MnO_2$ has a low oxygen evolution potential, and the adding of titanium sub-oxide can further improve its catalytic activity and corrosion resistance. In addition, the $\beta$-$PbO_2$—$Al_2O_3$ composite oxide in the intermediate conductive ceramic layer has good corrosion resistance and conductivity, so that the composite anode unit has a long service life as well as low cell voltage. Furthermore, $\gamma$-$MnO_2$ has low oxygen evolution overpotential and high chloride evolution overpotential during electrolysis process, therefore the evolution of chlorine is inhibited.

The present disclosure also provides a preparation method for the composite anode unit, comprising: a metal layer is formed on a metal core rod; a conductive ceramic layer is formed on the metal layer by composite anodic electrodeposition, wherein the conductive ceramic layer comprises $\beta$-$PbO_2$—$Al_2O_3$ composite oxide; an active ceramic layer is formed on the conductive ceramic layer by composite anodic electrodeposition, wherein the active ceramic layer comprises $\gamma$-$MnO_2$—$Ti_4O_7$ composite oxide.

All raw materials used in the present disclosure are commercially available and there is no special restriction on the source.

According to the present disclosure, the metal core rod is preferably formed by drawing and extrusion method. The metal core rod is as described above, and details are not described herein again. The metal core rod formed by drawing and extrusion method has a well refined aluminum alloy grain structure and high hardness, improving the service life and strength of the anode during use.

A first metal layer is preferred to form on the outside of the metal core rod, which is as described above, and details are not described herein again. The first metal layer can avoid the generation of poor conductive metal oxides during the preparation process and benefit the miscibility of the metal core rod with other metals, resulting in the decrease of the interface resistance and reduction of the cell voltage. The formation method of the first metal layer can be any of the well-known methods to one of ordinary skill in the art without any special restriction. In the present disclosure, anodic oxidation treatment on anode is preferably performed first to form an oxide layer, followed by the coating of the first metal layer; more preferably, the metal core rod is subjected to pre-treatment followed by anodic oxidation treatment to form an oxide layer and finished by the coating of the first metal layer.

The metal core rod is subjected to a pre-treatment which can be any of the well-known methods to one of ordinary skill in the art without any special restriction. In the present disclosure, the metal core rod is preferably subjected to sandblasting, followed by immersing in alkaline solution; after washing with water, the metal core rod is immersed in acid solution followed by washing with water to obtain pretreated metal core rod. The sandblasting can be any of the sandblastings well-known to one of ordinary skill in the art without any restriction; emery of 80-mesh to 300-mesh is preferred in the present disclosure. The alkaline solution can be any of the alkaline solution well-known to one of ordinary skill in the art without any restriction; alkali metal hydroxide solution is preferred in the present disclosure, more preferably sodium hydroxide solution and/or potassium hydroxide. The mass concentration of the alkaline solution is preferably from 8% to 12%. The immersion time in the alkaline solution is preferably from 2 min to 10 min.

The acid solution can be any of the acid solution well-known to one of ordinary skill in the art without any restriction, and nitric acid is preferred in the present disclosure. The mass concentration of the acid solution is preferably from 10% to 30%. The immersion time in the alkaline solution is preferably from 0.5 min to 1 min.

The metal core rod after pretreatment is subjected to anodic oxidation treatment to form an oxide layer. The anodic oxidation treatment can be any of the methods well-known to one of ordinary skill in the art without any special restriction. The anodizing bath for anodic oxidation treatment preferably comprises: 100 g/L to 180 g/L of sulfuric acid, 1 g/L to 30 g/L of oxalic acid, 1 g/L to 4 g/L of aluminum ion and 0.1 g/L to 1 g/L of gelatin; more preferably 120 g/L to 160 g/L of sulfuric acid, 2 g/L to 20 g/L of oxalic acid, 1 g/L to 4 g/L of aluminum ion and 0.1 g/L to 1 g/L of gelatin; most preferably 120 g/L to 140 g/L of sulfuric acid, 5 g/L to 10 g/L of oxalic acid, 1 g/L to 2 g/L of aluminum ion and 0.3 g/L to 0.5 g/L of gelatin. The current density for the anodic oxidation treatment is preferably from 1 $A/dm^2$ to 1.5 $A/dm^2$. The cell voltage is preferably 18V. The bath temperature for the anodic oxidation treatment is preferably from 20° C. to 30° C. The duration of the anodic oxidation treatment is preferably from 20 min to 60 min, more preferably from 30 min to 50 min, most preferably 40 min.

After the forming of the oxide layer, the metal core rod is preferably immersed in the acid solution and followed by coating with the first metal layer after washing with water. The acid solution can be any of the acid solutions well-known to one of ordinary skill in the art without any special restriction, and hydrochloride acid is preferred in the present disclosure. The mass concentration of the acid solution is preferably from 10% to 30%. The immersion time is preferably from 5 min to 30 min. The coating method can be any of the methods well-known to one of the ordinary skill in the art without any special restriction, and electrolysis is preferred in the present disclosure. When the first metal layer is nano-silver, it is preferred to perform electrolytic coloring treatment in the silver salt solution to obtain the first metal layer. The silver salt bath preferably comprises: 0.5 g/L to 2 g/L of $AgNO_3$, 5 g/L to 12 g/L of thiourea, 5 g/L to 25 g/L of sulfuric acid; more preferably 1 g/L to 2 g/L of $AgNO_3$, 8 g/L to 12 g/L of thiourea, 10 g/L to 25 g/L of sulfuric acid; most preferably 1 g/L to 1.5 g/L of $AgNO_3$, 10 g/L of thiourea, 10 g/L to 23 g/L of sulfuric acid. The temperature of the silver salt solution for the electrolytic coloring treatment is preferably from 10° C. to 30° C., more preferably from 15° C. to 25° C. The alternating voltage for the electrolytic coloring treatment is from 5V to 20V, more preferably from 10V to 20V, even more preferably from 15V to 18V, most preferably from 16V to 18V. The duration of the electrolytic coloring treatment is preferably from 0.5 min to 10 min, more preferably from 2 min to 8 min, most preferably from 2 min to 6 min. The counter electrode of the electrolytic coloring treatment is stainless steel.

The metal layer is coated on the first metal layer by extrusion coating method, which is as described above, and details are not described herein again. The extrusion coating method can be any of the methods well-known to one of the ordinary skill in the art without any special restriction. Preferred method in the present disclosure is as follow: melting lead or lead alloy is subjected to casting to obtain a lead ingot; the lead ingot is subjected to a hot-extrusion treatment to obtain a lead rod; the lead rod and the metal core rod coated with the first metal are subjected to an extrusion coating process to form a metal layer on the first metal layer. Forming the metal layer by this method can reduce the recrystallization phenomenon of lead alloy and avoid the problem of non-uniform element distribution of modifier, giving fine grains of the metal layer and better properties of the anode composite material.

Melting lead or lead alloy is subjected to a casting process to obtain a lead ingot. The contraction depth of casting opening in the casting process is not more than 20 mm to make full use of the lead or lead alloy and form more lead or lead alloy rod with high qualification rate in the punching machine.

The lead ingot is subjected to a hot extrusion treatment to obtain a lead rod. The extrusion rate is preferably one ingot for 1 min to 8 min, more preferably one ingot for 4 min to 8 min, most preferably one ingot for 6 min. The mass of the lead ingot is preferably from 25 kg to 30 kg. This step gives the metal layer a suitable and homogeneous thickness.

The lead rod and the metal core rod coated with the first metal layer are subjected to an extrusion coating treatment, forming a metal layer outside the first metal layer. The extrusion coating treatment is preferably performed on a cladding machine. The extrusion coating treatment has a high efficiency and good results.

A conductive ceramic layer is formed on the metal layer by composite anodic electrodeposition. The conductive ceramic layer comprises β-$PbO_2$—$Al_2O_3$ composite oxide. Composite anodic electrodeposition gives a uniform cladding surface and homogenous solid particle dispersion, making it easy to form the required film. The bath temperature for the composite anodic electrodeposition is preferably from 20° C. to 80° C., more preferably from 40° C. to 70° C. The anode current density of the composite anodic electrodeposition is preferably from 0.1 $A/dm^2$ to 10 $A/dm^2$, more preferably from 3 $A/dm^2$ to 10 $A/dm^2$, most preferably 3 $A/dm^2$ to 5 $A/dm^2$. The time for the composite anodic electrodeposition is preferably from 2 h to 20 h, more preferably from 2 h to 15 h, most preferably from 4 h to 10 h. The composite anodic electrodeposition is preferably performed under gas stirring condition, which gives the composite anodic electrodeposition a high efficiency and good results. The electroplating bath of composite anodic electrodeposition comprises: 10 g/L to 150 g/L of sulfuric acid, 5 g/L to 20 g/L of alumina particle, 1 g/L to 5 g/L of cobalt sulfate, 1 g/L to 8 g/L of magnesium sulfate, 1 g/L to 40 g/L of fluoride ion and 2 g/L to 6 g/L of bismuth ion; more preferably 50 g/L to 150 g/L of sulfuric acid, 5 g/L to 15 g/L of alumina particle, 1 g/L to 2 g/L of cobalt sulfate, 4 g/L to 6 g/L of magnesium sulfate, 5 g/L to 20 g/L of fluoride ion and 3 g/L to 5 g/L of bismuth ion. The alumina particle is preferably spherical. The particle size of the alumina particles is preferable from 10 μm to 50 μm, more preferably from 10 μm to 40 μm, even more preferably from 10 μm to 30 μm, and most preferably from 10 μm to 20 μm. Alumina particles in the above-mentioned range can form homogenous etch pits, which are good for the follow-up electrodeposition while alumina particles with too big or too small particle size do not have good results. Spherical alumina particles can maximize the size of etch pits and improve the homogeneity of the etch pits. Bismuth ion in the electroplating solution can improve the stability of lead dioxide film, as well as decrease the binding energy of lead and oxygen, so that the oxygen escapes more easily, making it easy to introduce amphoteric $Al_2O_3$ particle into β-Pb 02 plating layer.

An active ceramic layer is formed on the conductive ceramic layer by composite anodic electrodeposition, which comprises γ-$MnO_2$—$Ti_4O_7$ composite oxide. Since the active ceramic layer comprises $\gamma$-$MnO_2$—$Ti_4O_7$ composite oxide and when $\gamma$-$MnO_2$ in the $\gamma$-$MnO_2$—$Ti_4O_7$ composite oxide is used in electrolyte containing chloride ion, oxygen escapes more easily and the generation of chlorine is inhibited. It not only reduces the corrosion rate of the anode, but also improves the working condition for the workers and enhances the production efficiency greatly. Meanwhile, the introducing of the Titanium sub-oxide nano-particles into the $\gamma$-$MnO_2$ plating layer works synergistically with other elements, further improving the corrosion resistance and catalytic activity greatly. The bath temperature for the composite anodic electrodeposition is preferably from 40° C. to 90° C., more preferably from 50° C. to 80° C., most preferably from 60° C. to 70° C. The anodic current density for the composite anodic electrodeposition is preferably from 0.01 $A/dm^2$ to 1 $A/dm^2$, more preferably from 0.1 $A/dm^2$ to 0.8 $A/dm^2$, most preferably from 0.1 $A/dm^2$ to 0.5 $A/dm^2$. The duration of the composite anodic electrodeposition is preferably from 2 h to 30 h, more preferably from 5 h to 25 h, even more preferably 10 h to 20 h, and most preferably from 10 h to 12 h. The composite anodic electrodeposition is preferably performed under gas stirring condition, which gives the composite anodic electrodeposition a high efficiency and good result. The electroplating solution of the composite anodic electrodeposition comprises: 30 g/L to 250 g/L of manganese sulfate, 30 g/L to 100 g/L of sulfuric acid, 5 g/L to 20 g/L of Titanium sub-oxide nano-particles, 1 g/L to 10 g/L of cerium ion and 10 g/L to 100 g/L of potassium sodium tartrate; more preferably 50 g/L to 200 g/L of manganese sulfate, 50 g/L to 80 g/L of sulfuric acid, 5 g/L to 15 g/L of Titanium sub-oxide nano-particles, 3 g/L to 8 g/L of cerium ion and 20 g/L to 80 g/L of potassium sodium tartrate; most preferably 100 g/L to 150 g/L of manganese sulfate, 60 g/L to 70 g/L of sulfuric acid, 10 g/L of Titanium sub-oxide nano-particles, 5 g/L to 8 g/L of cerium ion and 30 g/L to 60 g/L of potassium sodium tartrate. The potassium sodium tartrate can stabilize the manganese ion, slow down the deposition rate of manganese dioxide, ensuring the homogeneity of the composite manganese deposition, which facilitates the introduction of Titanium sub-oxide nano-particles into the $\gamma$-$MnO_2$ plating layer. The particle size of the Titanium sub-oxide nano-particles is preferably from 1 nm to 80 nm, more preferably from 10 nm to 60 nm, even more preferably from 20 nm to 40 nm, most preferably from 20 nm to 30 nm. Using particles in the above-mentioned range efficiently decreases the internal stress of the plating layer and improves the catalytic activity of the plating layer.

Figure 6:
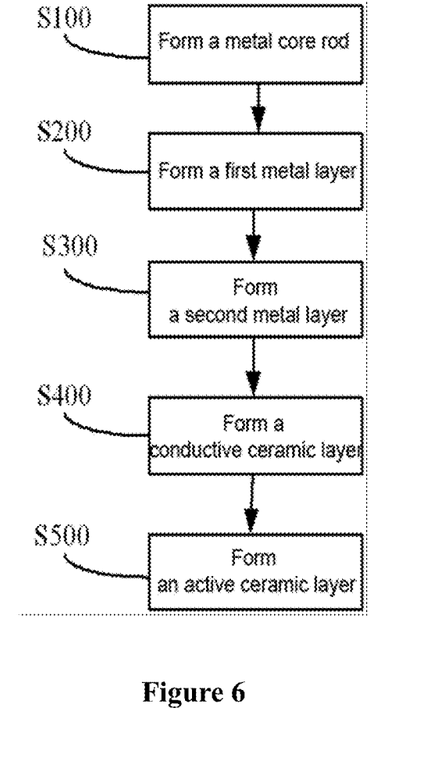
FIG. 6 is the flow diagram of the preparation process for the composite anode unit.

FIG. 6 is the flow diagram of the preparation process for the composite anode unit provided in the present disclosure.

Figure 2:
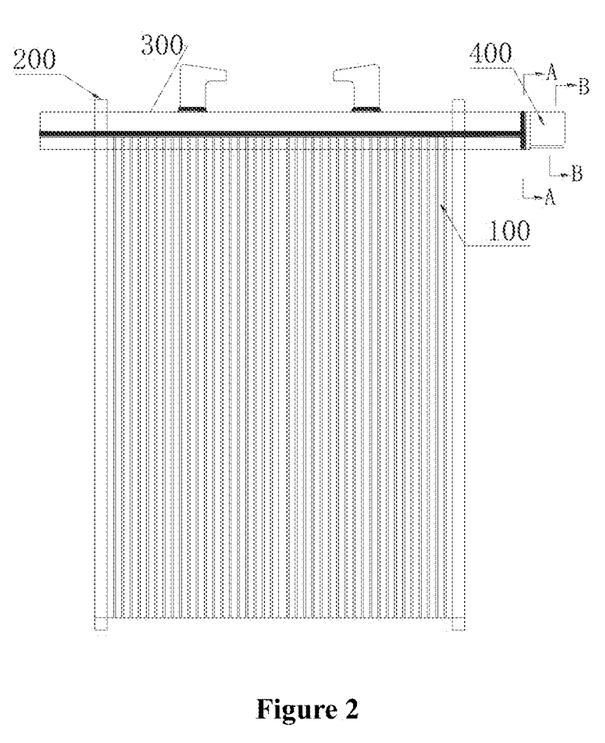
FIG. 2 shows the structure representation of the anode plate.
Figure 3:
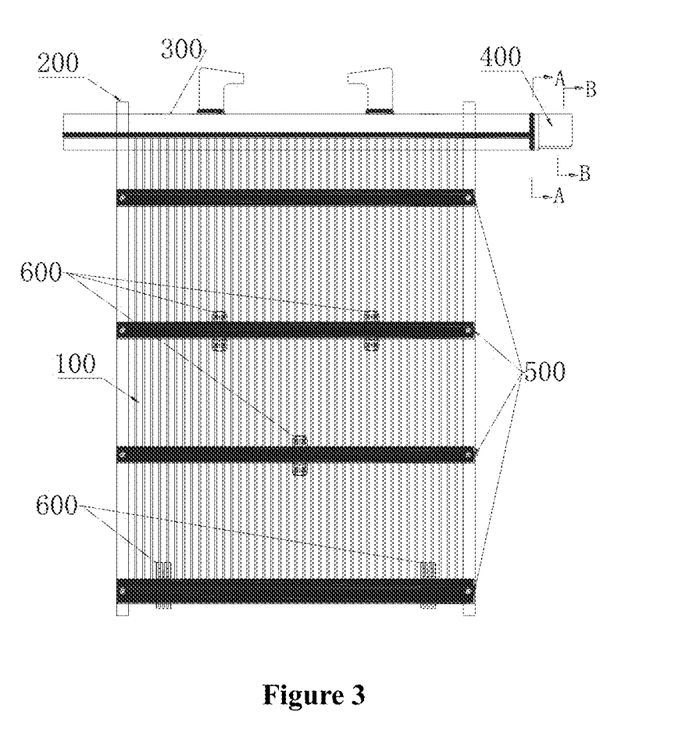
FIG. 3 shows the structure representation of the anode plate.

The present disclosure also provides an anode plate, comprising: an anode substrate, which is composed of the composite anode unit; a conductive beam, which is provided on one side of the anode substrate and connected to the anode substrate; preferably, the anode substrate has a fence-like structure. As shown in FIG. 2 and FIG. 3, FIG. 2 shows the structure of the anode plate provided by the present disclosure; herein, 100 indicates the anode substrate, 200 indicates the insulating frame, 300 indicates the conductive beam, and 400 indicates the conductive contact; FIG. 3 shows the structure of the anode plate provided by the present disclosure; therein, 100 indicates the anode substrate, 200 indicates the insulating frame, 300 indicates the conductive beam, 400 indicates the conductive contact, 500 indicates the fixing reinforcement, and 600 indicates insulating spacer.

When the fence-like anode plate provided by the present disclosure is used in the non-ferrous metal electrolytic process, it can reduce the short circuit phenomenon caused by deposition of anode slime, improve the fluidity of the electrolyte and the homogenous distribution of the current density of the electrode plate, significantly improve the stability and reliability of electrolysis, significantly inhibit the chlorine evolution and prolong the service life of the anode plate.

According to the present disclosure, the anode substrate has a fence-like structure which is assembled from the composite anode unit. The composite anode unit is as described above, and details are not described herein again. The length of the anode substrate is preferably from 300 mm to 3000 mm, more preferably from 500 mm to 2000 mm. The width of the anode substrate is preferably from 200 mm to 1500 mm, more preferably from 500 mm to 1000 mm. The gap between the composite anode units in the anode substrate is from 3 mm to 40 mm, more preferably from 5 mm to 20 mm. The number of the composite anode unit in the fence-like substrate is preferably 10 to 80 per piece, more preferably 20 to 50 per piece. Compared with conventional flat anode plate, the fence-like anode plate improves the fluidity of the electrolyte, decreases the concentration polarization of metal ions (copper, zinc, nickel) in cathode region, and increases the deposition of the cathode metal, resulting in the improvement of the cathode current efficiency. The surface area of the anode substrate is preferably from 0.5 $m^2$ to 3.6 $m^2$, more preferably from 0.6 $m^2$ to 3.6 $m^2$. In some examples provided by the present disclosure, the surface area of the anode substrate is preferably 0.6 $m^2$; 1.0 $m^2$, 1.2 $m^2$, 1.8 $m^2$, 2.0 $m^2$, 2.2 $m^2$, 2.6 $m^2$, 3.2 $m^2$ or 3.6 $m^2$ is also preferred.

A conductive beam is provided on one side of the anode substrate and connected to the anode substrate. The conductive beam can be any of the conductive beams well-known to one of the skill in the art without any special restriction. In the present disclosure, the conductive beam preferably comprises a first matrix and a second metal layer coated on the first matrix; the first matrix is preferably made from aluminum or aluminum alloy; the thickness of the first matrix is preferably from 3 mm to 50 mm; the second metal layer, which is preferably made from lead or lead alloy, is coated on the first matrix; the thickness of the second metal layer is preferably from 1 mm to 20 mm. Coating the second metal layer on the first matrix can reduce the generation of aluminum sulfate and copper sulfate, avoiding the problem of low quality of cathode product caused by the electrolyte brought by the conductive beam cleaning. In addition, compared with conventional corrosion-resistant plastic layer, the second metal layer increases the thermal conductivity of the conductive beam, avoiding the voltage increase caused by the heat generated by the conductive beam itself.

Figure 4:
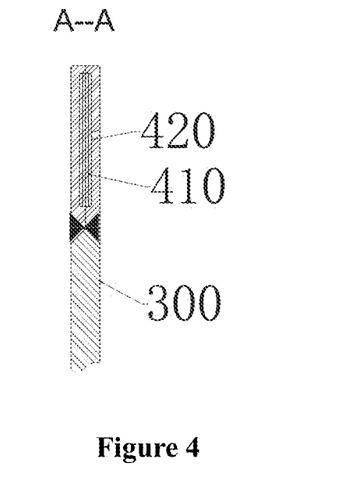
FIG. 4 shows the cross section of the conductive contact at A-A.
Figure 5:
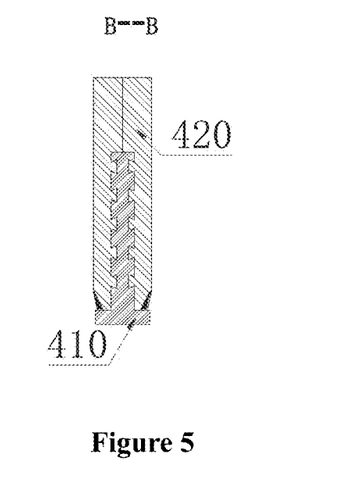
FIG. 5 shows the cross section of the conductive contact at B-B.

According to the present disclosure, the fence-like anode plate preferably includes conductive contact. The conductive contact is provided on one side of the conductive beam and connected to external power source. As shown in FIG. 4 and FIG. 5, FIG. 4 is the structure of the conductive contact at A-A, in which 410 indicates the second matrix, 420 indicates the third metal layer, 300 indicates the conductive beam, and 400 indicates the conductive contact. FIG. 5 is the structure of the conductive contact at B-B, in which 410 indicates the second matrix and 420 indicates the third metal layer.

The conductive contact can be any of the conductive contacts well-known to one of ordinary skill in the art without any restriction. A second matrix and a third metal layer coated on the second matrix are preferred in the present disclosure. The second matrix is preferably made from copper or copper alloy. The thickness of the second matrix is preferably from 6 mm to 30 mm. The third metal layer is coated on the surface of the second matrix. The third metal layer is preferably made from aluminum or aluminum alloy. The thickness of the third metal layer is preferably from 6 mm to 12 mm. The conductive contact provided by the present disclosure has a good conductivity, low power consumption and material cost, as well as low heat generation. In some examples provided by the present disclosure, the conductive contact is preferably clamp conductive contact or lap joint conductive contact, so that it can connect to the external power source easily. The third metal layer of the lap joint conductive contact is preferably "T" shape, in favor of increasing the surface connect between the second matrix and the third metal layer of the conductive contact, improving the conductivity of the conductive contact.

The fence-like anode plate provided by the present disclosure preferably includes insulating frame which is provided on both sides of the anode substrate and connected to the conductive beam. The insulating frame can avoid short circuit between the anode plate and the cathode plate. The insulating frame can be any of the insulating frames well-known to one of ordinary skill in the art without any special restriction. In the present disclosure, the insulating frame with a good insulation is made from material selected from impact polystyrene, modified polypropylene, modified polyethylene, acrylonitrile-styrene-butadiene copolymer and copolymer of modified polycarbonate and acrylonitrile-styrene-butadiene, or a mixture thereof. The impact polystyrene is preferably high impact polystyrene. The insulating frame is preferably has a square shape with slots, a width of 5 mm to 60 mm, a thickness of 5 mm to 50 mm. The anode substrate is fixed on the insulating frame by the slot.

More preferably, fixing reinforcement is included in the anode plate. The anode substrate is fixed through two terminals of the fixing reinforcement which are fixed on the insulating frame independently. The fixing reinforcement is sturdy, corrosion and aging resistant. The fixing reinforcement is preferably made from lead or lead-based multi-alloy. The lead-based multi-alloy is preferably selected from lead-silver-antimony alloy, lead-tin-antimony alloy, lead-silver-calcium-strontium alloy, lead-silver-calcium-rare earth alloy, lead-silver-tin-antimony alloy, lead-antimony-tin-rare earth alloy and lead-silver-antimony-tin-rare earth, or a mixture thereof. The fixing reinforcement made from the materials above can improve the corrosion resistance, conductivity and hardness of the anode, favoring the formation of a conductive ceramic film on the surface.

Even more preferably, insulating spacer is included in the anode plate. The insulating spacer is provided between the anode substrate and the fixing reinforcement, preventing the short circuit between the fixing reinforcement and the anode substrate. The insulating spacer can be any of the insulating spacers well-known to one of the ordinary in the art without any special restriction. In the present disclosure, the insulating spacer is preferably made from material selected from impact polystyrene, modified polypropylene, modified polyethylene, acrylonitrile-styrene-butadiene copolymer and copolymer of modified polycarbonate and acrylonitrile-styrene-butadiene, or a mixture thereof. The impact polystyrene is preferably high impact polystyrene having a good insulation property.

The present disclosure also provides a preparation method for the anode plate, comprising: S1) making the anode substrate; S2) loading conductive beam on the anode substrate to form electrical connection between the conductive beam and the anode substrate, i.e., the anode plate is obtained.

The anode plate is made from the composite anode unit; the composite anode unit is as described above, and details are not described herein again. The anode substrate in the present disclosure preferably has a fence-like structure.

A conductive beam is loaded on the anode substrate to form electrical connection between the conductive beam and the anode substrate. The details are as follows: welding the first matrix on the anode substrate; plating the second metal layer on the first matrix; preferably, the surface of the first matrix is subjected to brush lead plating and electroplating treatment before loading the conductive beam. Thus, the second metal layer is formed on the first matrix by the method of brush plating and electroplating, meeting the thickness requirement of the second metal layer. The bath temperature for electroplating is from 20° C. to 50° C., more preferably 30° C. to 40° C. The current density of the cathode is preferably from 1 A/dm$^2$ to 6 A/dm$^2$, more preferably from 3 A/dm$^2$ to 4 A/dm$^2$. Under condition of gas stirring, the duration of electroplating is from 8 h to 30 h, preferably from 10 h to 20 h, more preferably from 10 h to 12 h. Electroplating under the above-mentioned conditions has a high efficiency and good result. The electrolyte composition for the electroplating comprises: 100 g/L to 200 g/L of lead methanesulfonate, 30 mL/L to 80 mL/L of methanesulfonic acid, 1 g/L to 20 g/L of stannous methanesulfonate, 80 g/L to 180 g/L of sodium citrate, 1 g/L to 10 g/L of potassium antimony tartrate and 1 g/L to 10 g/L of additive; more preferably 100 g/L to 150 g/L of lead methanesulfonate, 40 mL/L to 60 mL/L of methanesulfonic acid, 10 g/L to 20 g/L of stannous methanesulfonate, 80 g/L to 160 g/L of sodium citrate, 2 g/L to 8 g/L of potassium antimony tartrate and 1 g/L to 5 g/L of additive; most preferably 100 g/L to 120 g/L of lead methanesulfonate, 50 mL/L of methanesulfonic acid, 10 g/L of stannous methanesulfonate, 80 g/L of sodium citrate, 5 g/L of potassium antimony tartrate and 2 g/L of additive. A preferred additive is gelatin. The lead plating formed in the electrolyte has a smooth surface and homogenous thickness.

Conductive contact is attached to the conductive beam, which connects the conductive beam to the external power source. The preparation method for the conductive contact comprises: preheated copper rod is subjected to immersion tin process to obtain a copper bar plated with tin; the copper bar plated with tin is coated with melting aluminum or aluminum alloy and subjected to thermite reaction and hot extrusion-drawing process to obtain an aluminum coated copper rod; molding is performed on the aluminum coated copper rod to obtain the conductive contact. Thus, conductive contacts with different shapes and sizes are easily obtained by this method with low production cost.

Figure 7:
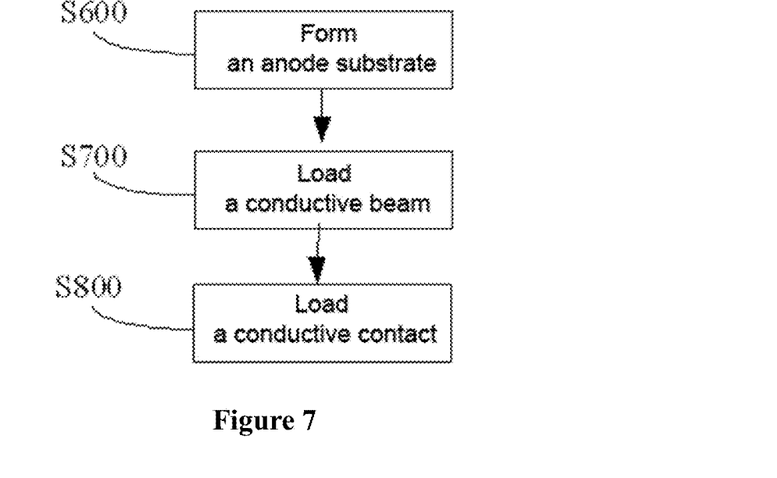
FIG. 7 is the flow diagram of the preparation process for the anode plate.

FIG. 7 is the flow diagram of the preparation process for the anode plate provided in the present disclosure.

In non-ferrous metal electrolysis process of the anode plate prepared by the present disclosure, the short circuit caused by the deposition of anode slime is reduced, the fluidity of the electrolytic and distribution uniformity of the plate current are improved, the stability and reliability of electrolytic are significantly increased, the evolution of chlorine is inhibited, and the service life of the anode plate is prolonged.

The advantages of the composite anode unit provided by the present disclosure are as follows:

(1) The conventional flat anode plate is replaced by the fence-like anode plate. Compared with the conventional flat anode plate, the fence-like anode plate can improve the fluidity of the electrolyte, reduce the concentration polarization of metal ions (copper, zinc, nickel) in cathode region and increase the metal deposition of cathode, therefore increasing the discharge efficiency of cathode.

(2) Sand blasting is performed on the aluminum rod before anodic oxidation treatment, followed by electrolytic coloring to generate nano-silver, which significantly increases the hardness, high temperature resistance and current conducting efficiency of aluminum avoids the disadvantage of the aluminum oxide with poor conductive generated in extrusion-drawing process, favors the miscibility of the aluminum rod with lead alloy, decreases the interface resistance and reduces the cell voltage.

(3) The copper-aluminum composite conductive contact of the conductive beam is prepared by thermite reaction, which decreases the cost of production and makes it easy to obtain composite conductive contacts with different shapes and sizes.

(4) Plating lead on the conductive beam reduces the generation of aluminum sulfate and copper sulfate, avoids the problem of low quality of cathode product caused by the electrolyte brought by the conductive beam cleaning. In addition, compared with corrosion-resistant plastic layer, the lead layer increases the thermal conductivity of the conductive beam, avoiding the voltage increase caused by exothermic reaction of the conductive beam.

(5) The lead alloy rod is prepared by hot extrusion from lead alloy ingot, avoiding the recrystallization of the lead alloy and the problem of non-uniform distribution of modifiers, achieving a better grain refinement effect of the lead alloy.

(6) Introducing amphoteric $Al_2O_3$ (which dissolves in hydrochloric acid) into $\beta$-$PbO_2$ coating layer, will cause the formation of homogenous etch pits on the surface. The follow-up composite deposition reduces the cracks on the $\gamma$-$MnO_2$ coating layer, making the binding between $\beta$-$PbO_2$ and $MnO_2$ tight, and extending the service life of electrode. The introducing of bismuth into $\beta$-$PbO_2$ coating layer improves the stability of lead dioxide film reduces the binding energy between lead and oxygen, making the escape of oxygen easy.

(7) Manganese dioxide forms an amorphous structure with $\beta$-$PbO_2$ plating layer easily when electrodeposition is performed in manganese sulfate solution system. When this type of anode is used in electrolyte containing chloride ion, oxygen escapes more easily and the generation of chlorine is inhibited. It not only reduces the corrosion rate of the anode, but also improves the working condition for the workers and enhances the production efficiency greatly.

(8) The introduce of the Titanium sub-oxide nano-particles into the $\gamma$-$MnO_2$ coating in manganese sulfate solution system works synergistically with other element, improving the corrosion resistance and catalytic activity greatly.

(9) Compared with conventional lead based alloy anode plate, the conductivity of the anode plate in the examples of the present disclosure is significantly improved, the cell voltage is 18% lower, material cost is 30% lower, current efficiency is increased 1% to 3%, as well as a good cathode production quality.

In order to further illustrate the present disclosure, the composite anode unit and the preparation method thereof, the fence-like anode plate and the preparation thereof are described hereinafter in conjunction with the examples of the present disclosure.

The reagents used in the examples are all commercially available.

Example 1

1.1 Aluminum rod having a rectangle cross section (10 mm of the major axis and 7 mm of the minor axis of the cross section) and corrugating pattern on the surface is prepared by drawing-extrusion process. Emery with a particle size of 300-mesh is sprayed on the surface of the aluminum rod. The aluminum rod is immersed in 10% sodium hydroxide solution for 10 min and then washed with water; it is immersed in 20% $HNO_3$ solution for 0.5 min and then washed with water. The cleaned rod is put into sulfuric acid for anodic oxidation treatment to obtain an oxide layer. Herein, the formula and parameters of the anode electrolyte are as follows: 120 g/L sulfuric acid ($H_2SO_4$), 10 g/L oxalic acid ($H_2C_2O_4$), 1 g/L aluminum ion, 0.3 g/L gelatin, anodic current density of 1 $A/dm^2$, cell voltage of 18V, temperature of 20° C., and duration of 40 min. Then the oxidized rod is immersed in 20% HCl solution for 20 min and washed with water. Then, the rod is put into a silver salt solution for electrolytic coloring to obtain the first metal layer, herein the silver salt bath comprises: 1.5 g/L $AgNO_3$, 10 g/L thiourea and 23 g/L sulfuric acid. The temperature of the electrolytic coloring silver salt bath is 15° C., the alternating voltage is 18V, the duration of coloring is 2 min and the counter electrode is made from stainless steel.

1.2 The aluminum alloy rod prepared in Step 1.1 is combined with lead alloy by drawing-extrusion process to obtain an aluminum-based lead alloy composite anode unit which is assembled into a 2.6 $m^2$ fence-like anode plate substrate (the number of the composite anode unit in the fence-like anode plate is 42 per plate; the gap between the composite anode units is preferably 5 mm; the length of the anode substrate is 1490 mm and the width is 960 mm). Finally, the fence-like anode plate substrate is welded to an aluminum or aluminum alloy conductive beam to obtain the aluminum-based lead alloy anode plate with fence-like structure. Herein, the aluminum-based lead alloy composite anode unit is prepared according to the following steps: the melting lead or lead alloy is casted in a vertical cylinder mold ($\Phi$120×350 mm) and the contraction depth of the casting opening is controlled to be less than 20 mm. A lead alloy ingot is obtained and put into the extrusion press immediately for hot extrusion process at a speed of one ingot for 6 min to obtain a lead rod with a diameter of 10 mm. The lead rod is collected with a take-up reel and put into an automatic extrusion coating machine together with aluminum rod of certain temperature at a speed of 10 m/min to obtain the aluminum-based lead alloy composite anode unit with a coating thickness of 4 mm. The copper-aluminum composite conductive contact of the aluminum or aluminum alloy conductive beam is prepared by the following steps: the copper rod is preheated to 300° C. and subjected to immersion tin process; the copper rod is coated by melting aluminum or aluminum alloy to make the thermite reaction happen on the surface to achieve metallurgical bond. The composite copper-aluminum rod is processed and the copper-aluminum conductive contact is obtained.

1.3 The aluminum-based lead alloy anode plate with a fence-like structure prepared in Step 1.2 is put into the electrolyte and subjected to electroplating under the conditions: gas stirring, temperature of 30° C., anodic current density of 10 $A/dm^2$, duration of 4 h. A $\beta$-$PbO_2$—$Al_2O_3$ conductive ceramic coating layer is formed on the surface of the fence-like anode plate. The fence-like anode plate is washed with water, dried and ready for use. The formula of the electroplating solution is: 100 g/L sulfuric acid ($H_2SO_4$), 10 g/L alumina particles (with an average $Al_2O_3$ particle size of 20 µm), 2 g/L cobalt sulfate ($CoSO_4$), 6 g/L magnesium sulfate ($MgSO_4$), 4 g/L fluoride ion ($F^-$) and 3 g/L bismuth ion. The electroplating solution is prepared by mixing all reagents and followed by 10 min ultrasonic dispersing before electrodeposition.

1.4 The aluminum-based lead alloy anode plate with a fence-like structure prepared in Step 1.3 is put into the electrolyte and subjected to electroplating under the conditions: gas stirring, temperature of 30° C., anodic current density of 0.1 A/dm², duration of 10 h. A $\gamma$-$MnO_2$—$Ti_4O_7$ active ceramic coating layer is formed on the surface of the fence-like anode plate. The fence-like anode plate is washed with water, dried and ready for use. The formula of the electroplating solution is: 150 g/L manganese sulfate ($MnSO_4$), 80 g/L sulfuric acid ($H_2SO_4$), 30 g/L potassium sodium tartrate, 10 g/L Titanium sub-oxide nano-particles (with an average $Ti_4O_7$ particle size of 20 nm) and 5 g/L cerium ion. The fence-like anode plate is immersed in 20% HCl for 10 min before electro-deposition is performed.

1.5 After lead brush plating, the conductive beam of fence-like anode plate prepared in Step 1.4 is put into the electrolyte and subjected to electroplating under the conditions: gas stirring, temperature of 30° C., anodic current density of 3 A/dm², duration of 10 h. A lead or lead alloy layer is formed on the surface of the conductive beam. The aluminum-based lead alloy composite anode unit plate for metal extraction in hydrometallurgy is obtained after water washing and drying. The formula of the electroplating solution is: 100 g/L lead methanesulfonate ($Pb(CH_3SO_3)_2$), 50 ml/L methanesulfonic ($CH_4SO_3$), 10 g/L stannous methanesulfonate ($Sn(CH_3SO_3)_2$), 80 g/L trisodium citrate ($C_6H_5O_7Na_3 \cdot H_2O$), 5 g/L antimony potassium tartrate ($C_4H_4O_6K(SbO) \cdot 2H_2O$) and 2 g/L gelatin. The electroplating solution is prepared by mixing all reagents followed by 10 min ultrasonic dispersing before electro-deposition.

The aluminum-based lead alloy composite anode plates with fence-like structure prepared in the examples are used in zinc electrolyte (60 g/L $Zn^{2+}$, 170 g/L $H_2SO_4$, 3 g/L $Mn^{2+}$, 50 mg/L sodium fluoride, 400 mg/L $Cl^-$ ion, 35° C., i=500 A/m²) for 100 days, and the results are shown in Table 1.

Table 1 Results of the anode plates used in zinc electrolyte after 100 days

| Anode | Erosion Rate (g/(m²·h)) | Cell Voltage (V) | Current Efficiency (%) | Lead Content of Cathode (%) |
|---|---|---|---|---|
| Conventional Pb-0.75% Ag | 0.971 | 3.233 | 88.59 | 0.0078 |
| Fence-like Al/Pb-0.75% Ag (same shape as that of Example 1) | 0.970 | 3.221 | 89.00 | 0.0076 |
| Example 1 | 0.313 | 2.845 | 90.09 | 0.0029 |
| Example 2 | 0.202 | 2.901 | 90.79 | 0.0021 |
| Example 3 | 0.426 | 2.864 | 89.22 | 0.0028 |
| Example 4 | 0.326 | 2.904 | 89.56 | 0.0031 |
| Example 5 | 0.323 | 3.146 | 88.70 | 0.0032 |
| Example 6 | 0.326 | 2.891 | 89.00 | 0.0028 |
| Example7 | 0.346 | 2.911 | 89.11 | 0.0026 |
| Example8 | 0.765 | 3.242 | 88.92 | 0.0034 |
| Example9 | 0.372 | 3.041 | 90.11 | 0.0027 |
| Example10 | 0.930 | 3.211 | 89.03 | 0.0066 |
| Example11 | 0.478 | 2.923 | 88.03 | 0.0036 |
| Example12 | 0.213 | 2.853 | 90.03 | 0.0027 |

As shown in Table 1, the corrosion resistance of the anode plate obtained in Example 1 of the present disclosure is 3.1 times more than that of conventional lead-silver alloy (Pb-0.75Ag) anode plate; the conductive efficiency is improved 1.5% and the cell voltage is decreased 388 mV.

Figure 8:
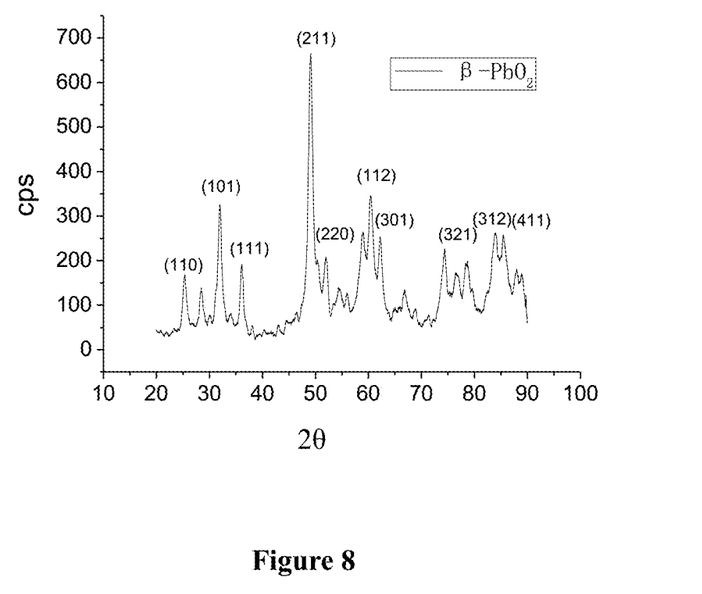
FIG. 8 is the X-ray Diffraction pattern of the conductive ceramic layer in Example 1.

X-ray diffraction is used to analyze the conductive ceramic layer obtained in Example 1 and the X-ray diffraction spectrum is shown in FIG. 8.

Figure 9:
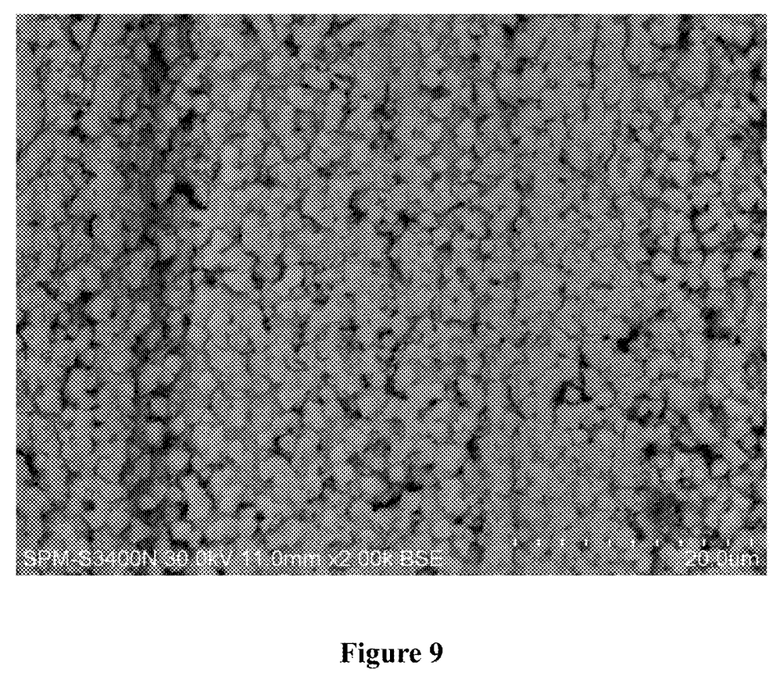
FIG. 9 is the surface morphology of the conductive ceramic layer in Example 1.

The scanning electron microscope is used to analyze the conductive ceramic layer obtained in Example 1; the surface morphology obtained and shown in FIG. 9.

Example 2

2.1 Aluminum rod having a circle cross section (diameter 10 mm of the cross section) and corrugating pattern on the surface is prepared by drawing-extrusion process. Emery with a particle size of 50-mesh is sprayed on the surface of the aluminum rod. The aluminum rod is immersed in 10% sodium hydroxide solution for 10 min and then washed with water; it is immersed in 20% $HNO_3$ solution for 0.5 min and then washed with water. The cleaned rod is put into sulfuric acid for anodic oxidation treatment to obtain an oxide layer. Herein, the formula and parameters of the anode electrolyte are as follows: 140 g/L sulfuric acid ($H_2SO_4$), 5 g/L oxalic acid ($H_2C_2O_4$), 1 g/L aluminum ion, 0.3 g/L gelatin, anodic current density of 1 A/dm², cell voltage of 18V, temperature of 20° C., and duration of 40 min. Then the oxidized rod is immersed in 20% HCl solution for 20 min and washed with water. Then, the rod is put into a silver salt solution for electrolytic coloring to obtain the first metal layer, herein the silver salt bath comprises: 1 g/L $AgNO_3$, 10 g/L thiourea and 10 g/L sulfuric acid. The temperature of the electrolytic coloring silver salt bath is 25° C., the alternating voltage is 16V, the duration of coloring is 6 min and the counter electrode is made from stainless steel.

2.2 The aluminum alloy rod prepared in Step 2.1 is combined with lead alloy by drawing-extrusion process to obtain an aluminum-based lead alloy composite anode unit which is assembled into a 3.2 m² fence-like anode plate substrate (the number of the composite anode unit in the fence-like anode plate is 44 per plate; the gap between the composite anode units is preferably 7 mm; the length of the anode substrate is 1720 mm and the width is 990 mm). Finally, the fence-like anode plate substrate is welded to an aluminum or aluminum alloy conductive beam to obtain the aluminum-based lead alloy anode plate with fence-like structure. Herein, the aluminum-based lead alloy composite anode unit is prepared according to the following steps: the melting lead or lead alloy is casted in a vertical cylinder mold (Φ120×350 mm) and the contraction depth of the casting opening is controlled to be less than 20 mm. A lead alloy ingot is obtained and put into the extrusion press immediately for hot extrusion process at a speed of one ingot for 6 min to obtain a lead rod with a diameter of 20 mm. The lead rod is collected with a take-up reel and put into an automatic extrusion coating machine together with aluminum rod of certain temperature at a speed of 10 m/min to obtain the aluminum-based lead alloy composite anode unit with a coating thickness of 3 mm. The copper-aluminum composite conductive contact of the aluminum or aluminum alloy conductive beam is prepared by the following steps: the copper rod is preheated to 300° C. and subjected to immersion tin process; the copper rod is coated by melting aluminum or aluminum alloy to make the thermite reaction happen on the surface to achieve metallurgical bond. The composite copper-aluminum rod is processed and the copper-aluminum conductive contact is obtained.

2.3 The aluminum-based lead alloy anode plate with a fence-like structure prepared in Step 2.2 is put into the electrolyte and subjected to electroplating under the conditions: gas stirring, temperature of 60° C., anodic current density of 10 A/dm², duration of 4 h. A β-$PbO_2$—$Al_2O_3$ conductive ceramic coating layer is formed on the surface of the fence-like anode plate. The fence-like anode plate is washed with water, dried and ready for use. The formula of the electroplating bath is: 150 g/L sulfuric acid (142504), 10 g/L alumina particles (with an average $Al_2O_3$ particle size of 10 μm), 2 g/L cobalt sulfate ($CoSO_4$), 4 g/L magnesium sulfate ($MgSO_4$), 12 g/L fluoride ion ($F^-$) and 5 g/L bismuth ion. The electroplating bath is prepared by mixing all reagents and followed by 10 min ultrasonic dispersing before electrodeposition.

2.4 The aluminum-based lead alloy anode plate with a fence-like structure prepared in Step 2.3 is put into the electrolyte and subjected to electroplating under the conditions: gas stirring, temperature of 60° C., anodic current density of 0.5 A/dm², duration of 12 h. A γ-$MnO_2$—$Ti_4O_7$ active ceramic coating layer is formed on the surface of the fence-like anode plate. The fence-like anode plate is washed with water, dried and ready for use. The formula of the electroplating bath is: 150 g/L manganese sulfate ($MnSO_4$), 60 g/L sulfuric acid ($H_2SO_4$), 60 g/L potassium sodium tartrate, 10 g/L Titanium sub-oxide nano-particles (with an average $Ti_4O_7$ particle size of 30 nm) and 5 g/L cerium ion. The fence-like anode plate is immersed in 20% HCl for 10 min before electro-deposition is performed.

2.5 After lead brush plating, the conductive beam of fence-like anode plate prepared in Step 2.4 is put into the electrolyte and subjected to electroplating under the conditions: gas stirring, temperature of 30° C., anodic current density of 3 A/dm², duration of 15 h. A lead or lead alloy layer is formed on the surface of the conductive beam. The aluminum-based lead alloy composite anode unit plate for metal extraction in hydrometallurgy is obtained after water washing and drying. The formula of the electroplating bath is: 120 g/L lead methanesulfonate ($Pb(CH_3SO_3)_2$), 50 ml/L methanesulfonic ($CH_4SO_3$), 10 g/L stannous methanesulfonate ($Sn(CH_3SO_3)_2$), 80 g/L trisodium citrate ($C_6H_5O_7Na_3 \cdot H_2O$), 5 g/L antimony potassium tartrate ($C_4H_4O_6K(SbO) \cdot 2H_2O$) and 2 g/L gelatin. The electroplating bath is prepared by mixing all reagents followed by 10 min ultrasonic dispersing before electro-deposition.

The aluminum-based lead alloy composite anode plate with fence-like structure prepared in Example 2 is used in zinc electrolyte (60 g/L $Zn^{2+}$, 170 g/L $H_2SO_4$, 3 g/L $Mn^{2+}$, 50 mg/L sodium fluoride, 400 mg/L $Cl^-$ ion, 35° C., i=500 A/m²) for 100 days, and the results are shown in Table 1. As shown in Table 1, the corrosion resistance of the anode plate obtained in Example 2 of the present disclosure is 4.8 times more than that of conventional lead-silver alloy (Pb-0.75Ag) anode plate; the conductive efficiency is improved 2.2% and the cell voltage is decreased 332 mV.

Example 3

The preparation method is the same as that of Example 1, except that the average particle size for $Al_2O_3$ and $Ti_4O_7$ is 50 μm and 80 nm, respectively.

Example 4

The preparation method is the same as that of Example 1, except that the average particle size for $Al_2O_3$ and $Ti_4O_7$ is 40 μm and 1 nm, respectively.

Example 5

The preparation method is the same as that of Example 1, except for no electrolytic coloring in silver salt solution.

Example 6

The preparation method is the same as that of Example 1, except that the content of $Al_2O_3$ and $Ti_4O_7$ is 5 g/L.

Example 7

The preparation method is the same as that of Example 1, except that the content of $Al_2O_3$ and $Ti_4O_7$ is 20 g/L and 5 g/L, respectively.

Example 8

The preparation method is the same as that of Example 1, except that the cross section of the metal core rod is oval (major axis of 6 mm and minor axis of 1 mm).

Example 9

The preparation method is the same as that of Example 1, except that the gap between the composite anode units of the anode substrate is 20 mm, the number of the composite anode unit is 27 per piece.

Example 10

The preparation method is the same as that of Example 1, except that the gap between the composite anode unit of the anode substrate is 40 mm, the number of the composite anode unit is 18 per piece.

Example 11

The preparation method was the same as that of Example 1, except that the gap between the composite anode units of the anode substrate is 3 mm, the number of composite anode unit is 51 per piece.

Example 12

The preparation method is the same as that of Example 1, except that the size of the assembled fence-like anode plate is 1.18 m² (the number of the composite anode unit in the fence-like anode plate is 33 per piece; the gap between the composite anode units is preferably 5 mm; the length of the anode substrate is 840 mm and the width is 700 mm).

In the descriptions of the present disclosure, the reference terms such as "an embodiment", "some embodiments", "an example", "specific example", "some examples" and the like indicate that the specific features, structures, materials or characters described in conjunction with the embodiment or example are included in at least one of the embodiments or examples in the present disclosure. In the present specification, the meanings of the terms above do not necessarily refer to the same embodiment or example. In addition, the particular features, structures, materials, or characteristics described in the present disclosure may be combined in any one or more of the embodiments or examples in a suitable manner.

What is claimed is:
1. A composite anode unit, comprising:
a metal core rod;

a metal layer coated on the metal core rod, wherein the metal layer is lead or lead alloy;

a conductive ceramic layer coated on the metal layer, wherein the conductive ceramic layer comprises $\beta\text{-PbO}_2\text{-Al}_2\text{O}_3$ composite oxide; and an active ceramic layer coated on the conductive ceramic layer, wherein the active ceramic layer comprises $\gamma\text{-MnO}_2\text{---Ti}_4\text{O}_7$ composite oxide.

2. The composite anode unit according to claim 1, wherein a first metal layer is provided between the metal core rod and the metal layer and the first metal layer is made from nano-silver; an oxide layer is provided between the metal core rod and the first metal layer.

3. The composite anode unit according to claim 1, wherein the cross section of the metal core rod is rectangle, oval or circle; the major axis of the rectangle or oval cross section is from 6 mm to 150 mm and the minor axis of the rectangle or oval cross section is from 2 mm to 20 mm; the diameter of the circle cross section is from 3 mm to 100 mm; the thickness of the metal layer is from 1 mm to 30 mm; the thickness of the conductive ceramic layer and the thickness of the active ceramic layer are each independently from 10 μm to 200 μm.

4. The composite anode unit according to claim 1, wherein $Al_2O_3$ content in the $\beta\text{-PbO}_2\text{-Al}_2\text{O}_3$ composite oxide is from 1 wt % to 8 wt %; $Ti_4O_7$ content in the $\gamma\text{-MnO}_2\text{---Ti}_4\text{O}_7$ composite oxide is from 1 wt % to 8 wt %.

5. A method for preparing the composite anode unit according to claim 1, comprising:
    S1) forming the metal layer on the metal core rod by extrusion coating process, wherein the metal layer is lead or lead alloy;
    S2) forming the conductive ceramic layer on the metal layer by composite anodic electrodeposition, wherein the conductive ceramic layer comprises $\beta\text{-PbO}_2\text{-Al}_2\text{O}_3$ composite oxide;
    S3) forming the active ceramic layer on the conductive ceramic layer by composite anodic electrodeposition, wherein the active ceramic layer comprises $\gamma\text{-MnO}_2\text{---Ti}_4\text{O}_7$ composite oxide.

6. The method according to claim 5, wherein the temperature for composite anodic electrodeposition in step S2) is from 20° C. to 80° C.; the anodic current density is from 0.1 A/dm² to 10 A/dm²; electroplating solution for the composite anodic electrodeposition comprises: 10 g/L to 150 g/L of sulfuric acid, 5 g/L to 20 g/L of alumina particles, 1 g/L to 5 g/L of cobaltous sulfate, 1 g/L to 8 g/L of magnesium sulfate, 1 g/L to 40 g/L of fluoride ion and 2 g/L to 6 g/L of bismuth ion; and the temperature for composite anodic electrodeposition in step S3) is from 40° C. to 90° C.; the anodic current density is from 0.01 A/dm² to 1 A/dm²; electroplating solution for the composite anodic electrodeposition comprises: 30 g/L to 250 g/L of manganese sulfate, 30 g/L to 100 g/L of sulfuric acid, 5 g/L to 20 g/L of Titanium sub-oxide nano-particles, 1 g/L to 10 g/L of cerium ion and 10 g/L to 100 g/L of potassium sodium tartrate.

7. The method according to claim 5, wherein step S1) comprises:
    casting melting lead or lead alloy to obtain a lead ingot; subjecting the lead ingot to hot-extrusion process to give a lead rod; subjecting the lead rod and the metal core rod to extrusion coating process to form the metal layer on the metal core rod.

8. The method according to claim 5, wherein step S1) further comprises:

subjecting the metal core rod to anodic oxidation treatment to form an oxide layer; forming a nano-silver layer on the oxide layer by electrochemical process; forming the metal layer on the nano-silver layer by extrusion coating process.

9. An anode plate, comprising:
    an anode substrate; the anode substrate is assembled from the composite anode unit according to claim 1;
    a conductive beam; the conductive beam is provided on one side of the anode substrate and connected to the anode substrate.

10. The anode plate according to claim 9, wherein the anode substrate has a fence-like structure; the length of the anode substrate is from 300 mm to 3000 mm; the width of the anode substrate is from 200 mm to 1500 mm; the gap between the composite anode units in the anode substrate is from 3 mm to 40 mm; the number of the composite anode unit in the anode substrate is from 10 to 80 per piece; the surface area of the anode substrate is from 0.5 m² to 3.6 m².

11. An anode plate, comprising:
    an anode substrate; the anode substrate is assembled from the composite anode unit according to claim 2;
    a conductive beam; the conductive beam is provided on one side of the anode substrate and connected to the anode substrate.

12. An anode plate, comprising:
    an anode substrate; the anode substrate is assembled from the composite anode unit according to claim 3;
    a conductive beam; the conductive beam is provided on one side of the anode substrate and connected to the anode substrate.

13. An anode plate, comprising:
    an anode substrate; the anode substrate is assembled from the composite anode unit according to claim 4;
    a conductive beam; the conductive beam is provided on one side of the anode substrate and connected to the anode substrate.

14. An anode plate, comprising:
    an anode substrate; the anode substrate is assembled from the composite anode unit prepared by the method according to claim 5;
    a conductive beam; the conductive beam is provided on one side of the anode substrate and connected to the anode substrate.

15. An anode plate, comprising:
    an anode substrate; the anode substrate is assembled from the composite anode unit prepared by the method according to claim 6;
    a conductive beam; the conductive beam is provided on one side of the anode substrate and connected to the anode substrate.

16. An anode plate, comprising:
    an anode substrate; the anode substrate is assembled from the composite anode unit prepared by the method according to claim 7;
    a conductive beam; the conductive beam is provided on one side of the anode substrate and connected to the anode substrate.

17. An anode plate, comprising:
    an anode substrate; the anode substrate is assembled from the composite anode unit prepared by the method according to claim 8;
    a conductive beam; the conductive beam is provided on one side of the anode substrate and connected to the anode substrate.

* * * * *